No. 764,538. PATENTED JULY 5, 1904.
F. H. RICHARDS.
CANDY PULLING MACHINE.
APPLICATION FILED MAY 12, 1904.
NO MODEL. 2 SHEETS—SHEET 1.
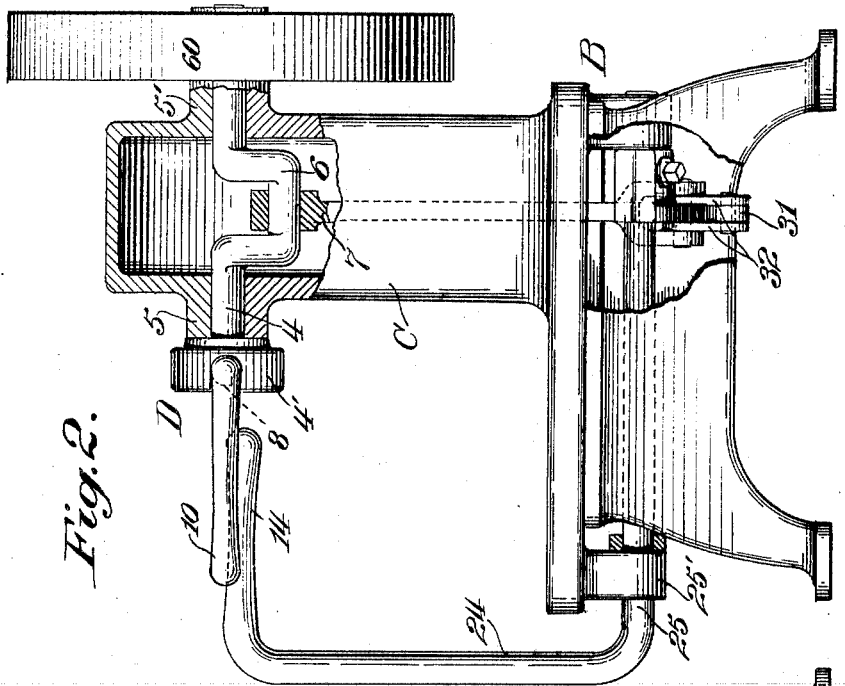
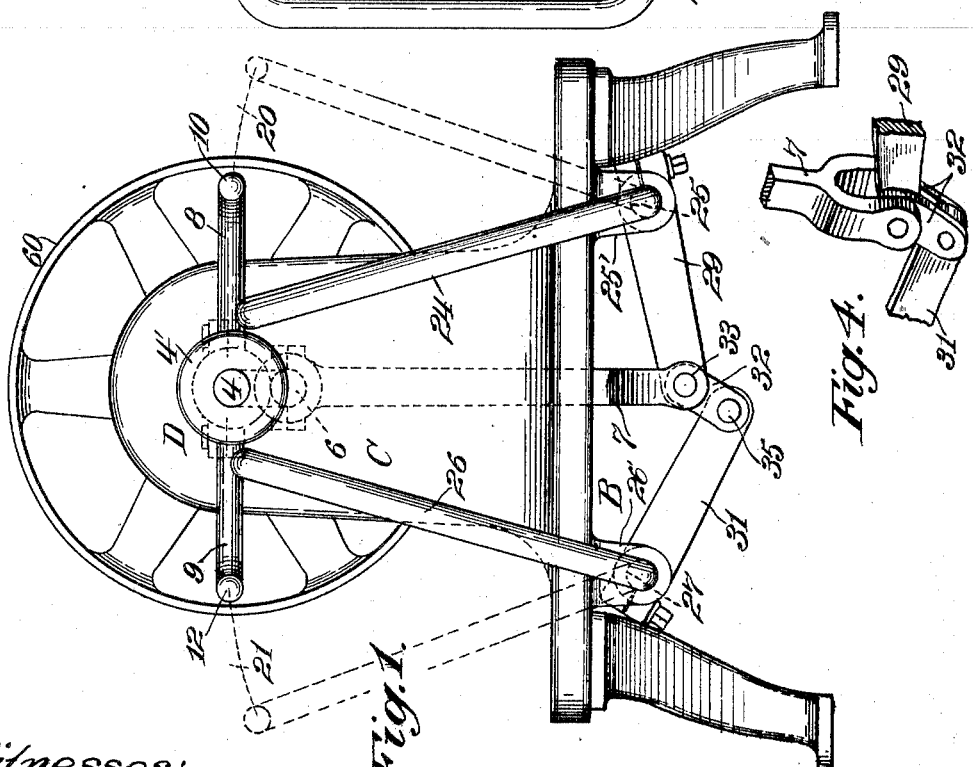
Witnesses:
P. W. Pittman
F. C. Maynard
Inventor:
F. H. Richards

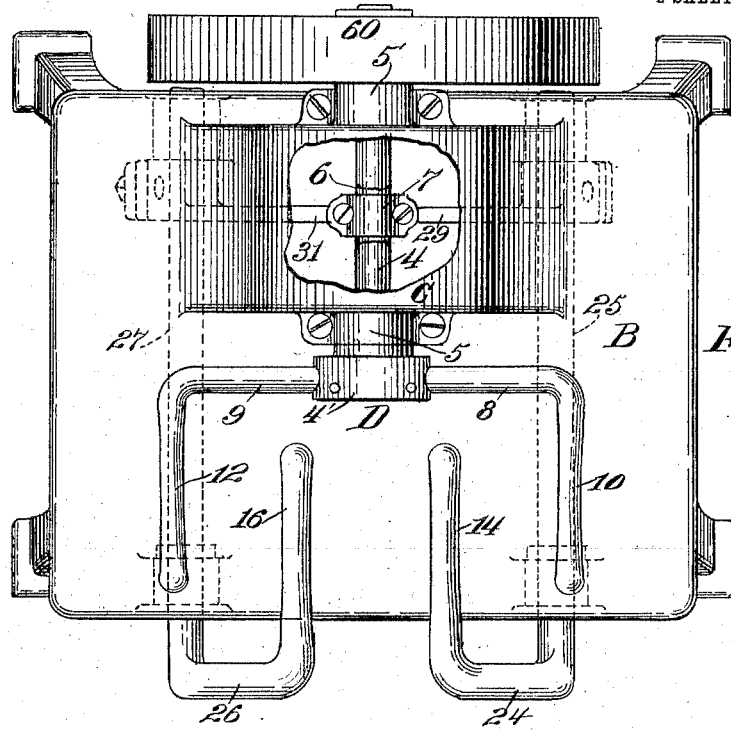

No. 764,538. Patented July 5, 1904.

UNITED STATES PATENT OFFICE.

FRANCIS H. RICHARDS, OF HARTFORD, CONNECTICUT.

CANDY-PULLING MACHINE.

SPECIFICATION forming part of Letters Patent No. 764,538, dated July 5, 1904.

Application filed May 12, 1904. Serial No. 207,509. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Candy-Pulling Machines, of which the following is a specification.

This invention relates to candy-pulling machines of the general class in which a plurality of grabs or pulling-arms are operated in relation to each other, so as to draw and lap the candy, and thus by continuous operation during a sufficient period of time bring the candy to the required condition and consistency.

In the drawings accompanying and forming a part of this specification, Figure 1 is a front elevation of a machine made in accordance with my present invention. Fig. 2 is a side elevation of said machine as seen from the right hand in Fig. 1. Fig. 3 is a plan view of the machine. Fig. 4 is a perspective view of one of the minor details. In Figs. 2 and 3 some parts of the framework are shown broken away for more clearly illustrating some features of the mechanism in the form and arrangement thereof which is illustrated in the drawings. Figs. 5, 6, 7, and 8 are diagrammatic views illustrative of the mode of operation of the pulling-arms in the operation of drawing and folding the mass of candy.

Similar characters of reference indicate like parts in all the drawings.

The object of the present improvement is to furnish a candy-pulling machine adapted for pulling and lapping the candy in a highly-efficient manner, and for this purpose I have provided a mechanism with an organization of four arms arranged in two pairs, of which one pair is arranged to revolve and the other pair is arranged to reciprocate toward and from each other and toward and from the axis of the revolving pair of arms. By means of this organization I provide a mechanism in which the candy is pulled, as indicated in Fig. 5, by three long pulls, and when these are fully drawn out, as in Fig. 6, they are then lapped over each other, as indicated in Fig. 7, with a long central lap. The further revolution of the revolving arms, as indicated in Fig. 8, carries the laps over on the other side to form two short-length folds, after which, as indicated in Fig. 5, the operation is repeated.

As a convenient means for carrying the operative parts of the mechanism I have shown the framework of the machine arranged in the form of a base (designated in a general way by B) and a column, (designated in a general way by C.) The column may be separate or integral with the base B. If made separate, it may be fastened thereto in any convenient or well-known manner. The upper portion of the column C is shown formed to serve as a casing for some of the details of the mechanism.

The principal features of the operative mechanism comprise a revolving grab mechanism (designated in a general way by D) and a reciprocatory mechanism comprising a plurality of non-revolving grabs or pulling-arms located for coacting with the arms of the revolving member D and supported and adapted for having a reciprocatory movement toward and from the common axis of the revolving arms, whereby said reciprocatory arms may be operated to carry them outside and inside alternately of the path or paths of movement of the revolving pulling-arms. The revolving grab D is shown provided with the shaft 4, which is supported in the bearings 5 5' on the column C. Said shaft is shown provided with a crank 6, that is operatively connected with the reciprocating mechanism by some suitable connection, as 7, whereby power may be transmitted to the reciprocatory pulling-arms. The shaft 4 is shown carrying a hub or center 4', from which project arms 8 and 9, carrying the rotatory pulling-arms 10 12, respectively. In Figs. 5, 6, 7, and 8 the path of movement of these arms is illustrated by the dotted circle 11, the direction of movement being shown by small arrows. For driving the shaft 4 it is shown provided with a pulley 60.

The reciprocatory pulling-arms are designated by 14 16, respectively, and they are shown carried by operating arms or levers 24 26, respectively, these levers being carried by shafts 25 27, supported in bearings 25' 26', carried on the base portion B of the framework of the machine. The rearward ends of said shafts 25 27 are shown provided with arms or levers 29 31, respectively, being fast on the shafts and the ends of the arms being connected at 33 and 35 by some suitable connection—as, for instance, the rods 32—with a crank 6, supported in some convenient manner for operating in unison with the revolving drag D.

When the mechanism and the various details thereof are organized and arranged as above described, it will be obvious that the revolution of the wheel 60 will act, through the crank 6 and the connecting mechanism, to give the shiftable or reciprocatory arms 14 and 16 a to-and-fro movement toward and from each other, (and also toward and from the axial line of the shaft 4,) so that said reciprocatory arms will have a to-and-fro movement, (represented by the dotted lines 20 and 21, respectively,) as indicated in a general way in Fig. 1.

From the foregoing and a comparison of the several figures of the drawings, especially Figs. 5, 6, 7, and 8 in connection with Fig. 1, it will be observed that in the particular form of machine illustrated the revolving arms 10 and 12 move substantially in the same path of revolution or rotation and that the reciprocatory arms operate, respectively, with one in particular of the two revolving arms. This will appear more clearly from the said diagrammatic views Figs. 5 and 8, in which it will be seen that the reciprocatory arm 16 at the left hand in said figures always passes outside of the respective rotary arm 10 and alternately with this movement passes inside of the opposite rotary arm 12. Likewise on the other side of the machine (which by reason of the features here described may be properly designated as a duplex or double-acting machine) the reciprocatory arm 14, which is shown at the right hand in said figures, operates in a corresponding manner in connection with the other rotary arm 12. Said right-hand reciprocatory arm 14 passes outside of said rotary arm 12 and alternately with this movement it passes inside, not of the same arm, but of the other or opposite rotary arm 10. Thus the two reciprocatory arms have, respectively, the same kind of operation and coact directly with the two rotary arms, respectively. By means of this peculiar organization of the members which act directly upon the candy or analogous material being worked this material is subjected to the drawing actions, which extend, as indicated, for instance, by comparison of Figs. 5 and 6, throughout the entire mass under treatment, and after the material has been so drawn out by the triple drafts the strands, as indicated by 34, 35, and 36, are first folded with a long fold, as indicated in Fig. 7, and they are immediately folded again with a short fold, as will be understood by comparing Fig. 8 with Fig. 7. By this means the material is lapped upon itself preparatory to being again drawn out ready for a further lapping, and so on repeatedly until it is subjected to a sufficient amount of treatment. From this comparison of said diagrammatic views it will be observed that the reciprocatory arm 16 always passes "outside" of a given rotary arm, as 10, and that said arm 16 similarly always passes "inside" of the oppositely-disposed rotary arm 12. In a corresponding manner the opposite reciprocatory arm 14 uniformly takes a position (when the corresponding rotary arm is adjacent thereto) outside of said rotary arm 12. On the opposite stroke of said reciprocatory arm 14 it (in the same manner above noted) passes inside of the opposite rotary arm 10. By means of this particular organization of the system of four working arms, of which arms two of them are rotary and two of them are reciprocatory, there being two arms of each of said kinds, the action of the mechanism is in a sense duplicated, so that corresponding pulling, folding, and drawing movements or operations are proceeding at the same time on each side of the central axis or shaft of the machine. In this respect this improved mechanism differs essentially from the other machines heretofore in use for "pulling" candy.

In the operation of this machine in the form and arrangement thereof which I have herein illustrated the actuating devices which connect the revolving mechanism with the reciprocatory mechanism are operable for imparting simultaneous reciprocatory movements to said two reciprocatory arms in opposite directions, respectively, and for imparting one complete double-stroke movement to each of said reciprocatory arms during each revolution of the rotary arms. As a result of this organization and mode of operation of the system of mechanism comprising two pairs of arms (one pair being rotary and the other being reciprocatory) a given reciprocatory arm always passes outside of a given rotary and inside of the opposite rotary arm. In Figs. 6 and 7 the reciprocatory arms 14 and 16 are shown outside of their respective directly-coacting rotary arms 12 and 10, whereas in Fig. 8 the reciprocatory arms are shown located inside of the opposite rotary arms, respectively. For instance, in Fig. 6 the reciprocatory arm 16 is shown located outside of the revolving arm 10 and in Fig. 8 is shown located inside of the opposite revolving arm 12.

During a complete rotation of the pair of rotary arms it will be observed that the reciprocatory arms come into such alinement that all of the arms are located substantially in a row and with the reciprocatory arms within the path of the rotary arms, this being illustrated, for instance, in Fig. 8. On the next half-revolution of the rotary arms it will be observed that the reciprocatory arms similarly come into substantial alinement or into a row with the rotary arms, but this time on the outside of said path of revolution. This feature is illustrated by the diagrammatic views Figs. 6 and 7. By means of this organization and mode of operation of the pulling-arms in a system of four arms arranged in two pairs the candy is treated in a peculiar manner, it being subjected to long drafts or pulls in three strands, (see Figs. 5 and 6, above described,) then folded and lapped in long laps, and next the end portions of the folded mass being then drawn out by short pulls and further lapped together. These features are indicated by Figs. 7 and 8.

In the operation of my improved pulling-machine the pair of rotatable or revoluble pulling-arms are arranged to move in similar orbital paths, and I deem it preferable to have them move in the same path—that is to say, in the same circular path—said arms being located at substantially the same distance from their common axis of revolution. The pair of reciprocatory pulling-arms being located, respectively, on opposite sides of the axis of revolution of the rotary arms and connected with each other by suitable actuating means—such, for instance, as illustrated in the drawings—said reciprocatory arms will then during the operation of the machine have alternate inward and outward movements toward and from each other and toward and from said common axis of revolution of the rotary arms. On a given half-revolution of the rotary arms the reciprocatory arms are brought toward each other and within the orbital path of the rotary arms. On the next succeeding half-revolution of the rotary arms said reciprocatory arms are each carried away from the other and into a position outside of said orbital path.

By means of my improved candy-pulling apparatus the candy is drawn out and lapped by a process in which the entire length of the mass is drawn substantially equal throughout and the drawing is mainly accomplished by three simultaneous long pulls, the three strands being then lapped together. The result of this process is to draw the entire mass simultaneously and with a high degree of uniformity throughout the entire mass and then to lap the strands first by a long lap followed by a relatively small drawing out and a succeeding short one. This double system of lapping by long and short laps alternately is carried out on both sides of the machine at the same time in the same manner, with the result that the entire mass is drawn and lapped and again pulled out not only in a very efficient and thorough manner, but with a high degree of speed, so that the machine operated at a given speed for a given period is adapted to treat properly a relatively large quantity of material.

In the operation of this machine the mass of candy is subjected to the operation of pulling in such manner as to draw the mass out into a plurality of strands, which are then lapped upon each other, and the ends of the mass so formed are folded over onto and just beyond the middle portion of the mass, which at the middle part thereof is then kneaded together, thereby to firmly unite or bond the strands into a relatively solid mass, whereupon the drawing and lapping operations are repeated as before. This novel feature results in favorably modifying the drawing operations, since the kneading together of the folded strands so changes these as to secure a high degree of integrality or cohesion of the strands in the mass as a whole, with the result that when the pulling operations are repeated the flowage of the candy in the mass is controlled and modified and the efficiency of the operations are materially improved. When the pulling-arms are carrying a normal amount of candy thereon and when the long laps are made, as in Fig. 7, the reciprocatory pulling-arms 14 16 being then advanced toward each other fold the ends past each other (see Fig. 8) over the middle portion of the mass and then directly knead or press the whole mass together in the middle portion thereof, thereby firmly incorporating the strands together, and so preparing them for a repetition of the complete operation.

For convenience of construction the reciprocatory pulling-arms 14 and 16 are shown carried on relatively long arms or levers 24 and 26, which have a forward-and-backward movement toward and from each other, thus incidentally giving to the said reciprocatory arms a movement in a path of slight curvature; but it is evident that such specific features of the mechanism may be modified in various ways within the scope and limits of my present invention.

Having thus described my invention, I claim—

1. In a pulling-machine the combination with a pair of pulling-arms located respectively on opposite sides of their axis of revolution and revoluble in similar orbital paths, of a pair of reciprocatory pulling-arms located respectively on opposite sides of the axis of revolution of the revoluble arms, and actuating means connecting the several arms for bringing the reciprocatory arms toward each other and so bring both within the orbital path of the rotary arms on a half-revolution of said revoluble arms, and to carry said reciprocatory arms each away from the other and so bring both of them outside of said orbital path on the succeeding half-revolution of the rotary arms.

2. In a pulling-machine the combination with a system of four pulling-arms arranged in two pairs, of means for revolving one pair of said arms in an orbital path, and means for reciprocating the two arms respectively of the other pair in opposite directions first toward and then from the axis of rotation of the revoluble pair of arms.

3. In a pulling-machine, the combination with two pairs of pulling-arms, of means for revolving one pair of said arms, a pair of rocking members each carrying one of the other pulling-arms, and a reciprocatory driving connection intermediate the revolving arms in time with the revolving arms to bring the reciprocatory arms into substantial alinement with the revolving arms within the path of revolution of the same on a given half-revolution of the revolving arms, and to bring said reciprocatory arms into substantial alinement with said revolving arms outside of said path of revolution on the succeeding half-revolution of the revolving arms.

4. In a pulling-machine, the combination with a rotatable shaft carrying a pair of pulling-arms located in oppositely-disposed positions thereon, a pair of rocking members each carrying a pulling-arm and having these pulling-arms located respectively on opposite sides of said rotatable shaft, actuating-levers extending from said rocking members, a crank operative with said shaft, and a connection from the crank to said levers for imparting to said rocking members and their reciprocatory pulling-arms simultaneous movements in opposite directions, whereby to carry said reciprocatory arms first toward each other and to positions within the path of revolution of the revolving arms, and then away from each other to positions outside of said path of rotation.

5. In a pulling-machine, the combination with suitable supporting-framework and a revoluble shaft mounted thereon and carrying pulling-arms, of a pair of rocking members located one on either side of the machine and each provided with a pulling-arm located and adapted for reciprocatory movements, of a crank on the revoluble shaft and actuating connections from the crank to both of said rocking members for imparting simultaneous reciprocatory movements to said rocking members in opposite directions respectively.

6. In a pulling-machine, the combination with a revolving mechanism carrying two pulling-arms, of a reciprocatory mechanism carrying two additional pulling-arms, and actuating devices connecting said mechanisms and operable for imparting simultaneous reciprocatory movements to said two reciprocatory arms in opposite directions respectively, and for imparting one complete double-stroke movement to each of said reciprocatory arms during each revolution of the revoluble arms.

7. In a pulling-machine, the combination with a revolving mechanism provided with two pulling-arms, of a reciprocatory mechanism provided with two reciprocatory arms located on opposite sides respectively of the revolving mechanism and comprising two rocking members each provided with an actuating-lever extending toward the other of the rocking members and intermediate actuating devices to connect the revolving mechanism with the reciprocatory mechanism and comprising a connecting-rod operatively connected with each of said levers.

8. In a pulling-machine, the combination with a revoluble shaft carrying one or more pulling-arms, of a pair of rocking members located one on either side of the machine and each provided with a pulling-arm located and adapted for reciprocatory movements extending outside and inside of the path of the revolving arm or arms, and means for actuating said rocking members.

9. In a pulling-machine, the combination with a revolving mechanism carrying a plurality of pulling-arms located for movement in substantially the same path of revolution, of a reciprocatory mechanism having one or more pulling-arms located for reciprocatory movements extending outside and inside of the path of the revolving arms and substantially radially of said path, and actuating devices connecting said mechanisms for imparting reciprocatory movements to the reciprocatory mechanism to cause an arm to cross the path of each revolving arm in each direction during each revolution thereof.

10. In a pulling-machine, the combination with a revolving mechanism provided with one or more pulling-arms, of a reciprocatory mechanism provided with a plurality of pulling-arms and comprising two rocking members provided with levers for actuating the same, and actuating means operatively connecting the revolving mechanism with said levers of the reciprocatory mechanism for actuating the reciprocatory arms in uniform time with the revolutions of the revolving mechanism and to cause said reciprocatory arms to cross the path of each revolving arm once during each revolution thereof but in opposite directions.

11. The combination with a pair of revoluble arms and means to revolve the same, of a pair of reciprocatory arms and means to reciprocate the same into and out of the orbital circuit of the revoluble arms, and during each revolution thereof, whereby each revoluble arm during one revolution passes inside of one reciprocatory arm and outside of the other.

12. In a candy-pulling machine, the combination with a pair of revoluble arms and means for revolving the same, of a pair of oppositely-disposed reciprocatory arms and means for reciprocating the same to a point adjacent to the axis of revolution of said revoluble arms and at a period in the revolution thereof when all the arms are in substantial alinement and to reciprocate the same without the orbit of revolution thereof and when all the arms are in substantial alinement.

13. In a candy-pulling machine, the combination with a plurality of revoluble arms, a pair of oppositely-disposed reciprocatory arms adapted to pass radially through the orbit of revolution of said arms and to engage the mass carried by such arms and to press the same toward the axis of the orbit of said arms during the revolution thereof.

14. In a pulling-machine the combination with a system of pulling-arms, means for revolving a portion thereof in an orbital path, means for reciprocating other of said arms respectively in opposite directions toward and from each other and from the axis of revolution of said revoluble arms, and against the mass of material carried thereby to knead the said mass, and away from said mass to pull the same.

15. In a pulling-machine, the combination with a system of pulling-arms, means for revolving a portion thereof in an orbital path, means for reciprocating other of said arms respectively in opposite directions toward and from each other and from the axis of revolution of said revoluble arms, and against the mass of material carried thereby to knead the said mass, and away from said mass to pull the same, members to carry said reciprocatory arms, and operating connections to give simultaneous strokes to said arms.

16. In a pulling-machine the combination with a system of pulling-arms, a portion whereof are located in an orbital path and means for carrying said arms and for revolving the same in such path, and portion of said arms is located to reciprocate toward and from each other in a path of movement crossing the said orbital path and approaching the axis thereof, members for carrying said reciprocatory arms and operative connections between the same and said power-carrying means to give simultaneous strokes to said arms and in their strokes toward each other in said path to come against the mass and knead it.

Signed at Nos. 9 to 15 Murray street, New York, N. Y., this 11th day of May, 1904.

FRANCIS H. RICHARDS.

Witnesses:
 FRED. J. DOLE,
 JOHN O. SEIFERT.